(12) United States Patent
Prentice et al.

(10) Patent No.: US 7,292,267 B2
(45) Date of Patent: Nov. 6, 2007

(54) DUAL MODE DIGITAL IMAGING AND CAMERA SYSTEM

(75) Inventors: Wayne E. Prentice, Honeoye Falls, NY (US); Thomas N. Berarducci, Webster, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1002 days.

(21) Appl. No.: 10/274,658

(22) Filed: Oct. 21, 2002

(65) Prior Publication Data

US 2003/0030729 A1 Feb. 13, 2003

Related U.S. Application Data

(63) Continuation of application No. 08/712,692, filed on Sep. 12, 1996, now abandoned.

(51) Int. Cl.
*H04N 5/225* (2006.01)

(52) U.S. Cl. .................. 348/207.1; 348/220.1

(58) Field of Classification Search .......... 348/220.1, 348/252
See application file for complete search history.

(56) References Cited

U.S. PATENT DOCUMENTS 5,444,483 A * 8/1995 Maeda ................ 348/231.6
5,675,358 A    10/1997 Bullock et al.
5,712,680 A *  1/1998 Hieda ................. 348/220.1
5,734,427 A *  3/1998 Hayashi .............. 348/333.11
5,959,622 A *  9/1999 Greer et al. ............ 715/719
5,969,750 A * 10/1999 Hsieh et al. ............ 348/14.1

* cited by examiner

*Primary Examiner*—David Ometz
*Assistant Examiner*—Luong T. Nguyen
(74) *Attorney, Agent, or Firm*—Thomas J. Strouse

(57) ABSTRACT

A dual mode digital imaging system has a still processing mode that produces an output image in a first color space and a motion processing mode that produces an output image in a second color space, in particular a first color space that is RGB and a second color space that is YUV. The digital imaging system includes a dual mode digital camera for use with a computer and a processing application for running on the computer, wherein the motion mode processing is relatively less complex than the still mode processing although at least one common control parameter is used to control both modes. The motion mode processing, which is performed using algorithms and software approaches designed to minimize processing time, nonetheless produces an entirely adequate relatively low resolution YUV image appropriate for applications such as videoconferencing. The still mode processing, on the other hand, uses more elaborate algorithms to optimize the image quality of a relatively high resolution RGB output image.

19 Claims, 7 Drawing Sheets

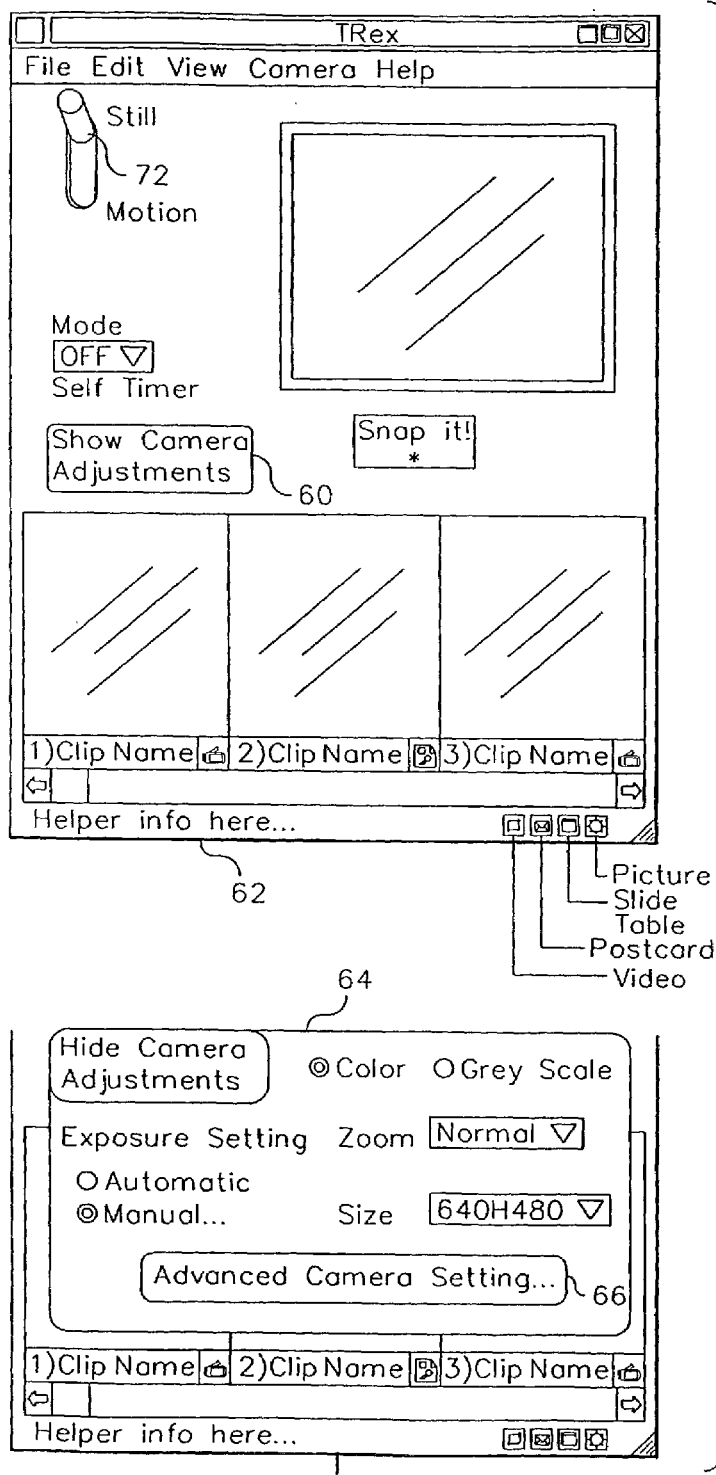

DUAL MODE DIGITAL IMAGING AND CAMERA SYSTEM

CROSS-REFERENCE TO RELATED APPLICATION(S)

The present application is a continuation of application Ser. No. 08/712,692, filed Sep. 12, 1996 now abandoned.

Reference is made to commonly assigned copending application Ser. No. 08/712,704, entitled "Multi-Mode Digital Camera with Computer Interface Using Data Packets Combining Image and Mode Data," filed in the names of J. A. Endsley, T. N. Berarducci and W. E. Prentice on the same date herewith, and subsequently issued as U.S. Pat. No. 6,005,613; and Ser. No. 08/712,689, entitled "Timing Control for a Digitally Interfaced Camera Using Variable Line Readout Intervals," filed in the names of J. A. Endsley, T. N. Berarducci, and K. A. Parulski on the same date herewith, and subsequently issued as U.S. Pat. No. 5,841,471; each of which is assigned to the assignee of the present application.

FIELD OF THE INVENTION

The invention relates generally to the field of electronic photography, and in particular to a digital camera capable of interfacing with a computer.

BACKGROUND OF THE INVENTION

There are generally two types of electronic cameras, those that produce motion images and those that produce still images. Typical motion cameras include motion video cameras and computer-connected cameras like the Color Quick-Cam□, sold by the Connectix Corporation, and typical still cameras include the Kodak line of digital cameras, including the DC40 and DC50 cameras, sold by the Eastman Kodak Company. With motion video cameras, it is typical to input images to a computer via a "frame grabber" board. In this case still images and motion images are captured using a single field or frame of the video. Therefore, the processing for motion and still images, performed in hardware inside the camera, is the same whether still or motion images are captured.

With electronic still cameras, the output processing is typically oriented toward still images, since still image capture is the object of the camera. U.S. Pat. No. 5,402,170, entitled "Hand-manipulated Electronic Camera Tethered to a Personal Computer", describes a digital still camera tethered to a computer for capturing an image and providing the captured image to the computer for storage therewith. In one embodiment, the camera includes a scan rate video sensor, producing a motion video signal, and the computer interface includes a framestore board which captures a frame out of the continuous video signal output by the sensor.

If the electronic still camera provides another mode, it is typically subsidiary to the main purpose. For example, in U.S. Pat. No. 5,828,406, an electronic still camera is described in which a motion mode is used to provide a "preview" image on an LCD viewfinder prior to still mode capture. This preview processing is preferably done using hardwired circuitry, which makes the camera more expensive and makes the processing less adaptable. The camera does not output the motion image data, but simply displays the motion data on the LCD display. The camera does not allow the user to affirmatively elect between the motion and the still mode.

U.S. Pat. No. 5,301,244, entitled "Computer Input Scanner Incorporating Multiple Scanning Modes", describes a film scanner useful as an input device for a computer. The film scanner is operable in two modes: the first mode is a low resolution monochrome prescanning mode used for composing (zooming and cropping) the image, and the second is a high-resolution color sequential mode in which three successive high resolution color scans are obtained. Two user-controlled switch functions on the scanner are used: one to continuously capture low resolution frames in the prescan mode, and the second to initiate a high-resolution scan. Except for digitizing the film image at different spatial resolutions and using only the green color record in the prescanning mode, the processing in each mode is the same.

While describing two modes of operation in some cases, the prior art does not allow for optimization of processing in the separate modes.

SUMMARY OF THE INVENTION

The present invention is directed to overcoming one or more of the problems set forth above. Briefly summarized, according to one aspect of the present invention, a dual mode digital imaging system has a still processing mode that produces an output image in a first color space and a motion processing mode that produces an output image in a second color space, in particular a first color space that is RGB and a second color space that is YUV. More specifically, the digital imaging system includes a dual mode digital camera for use with a computer and software for running on the computer, wherein the motion mode processing is relatively less complex than the still mode processing although at least one common control parameter is used to control both modes.

The advantage is that the motion mode processing, which is performed using algorithms and software approaches designed to minimize processing time, nonetheless produces an entirely adequate relatively low resolution YUV image appropriate for applications such as videoconferencing. The still mode processing, on the other hand, uses more elaborate algorithms to optimize the image quality of a relatively high resolution RGB output image. Instead of "point" processing as in the motion mode, the still mode uses spatial processing as well as point processing, for example, by providing "edge enhanced" pixel values using a two-dimensional finite impulse response (FIR) filter operating on neighboring pixels. The rendition of the output image is substantially the same in both modes since the same user controls for contrast, color saturation, brightness, hue and white balance affect both processing modes via the different processing paths.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed for practice of the invention is conventional and within the ordinary skill in such arts.

Figure 1:
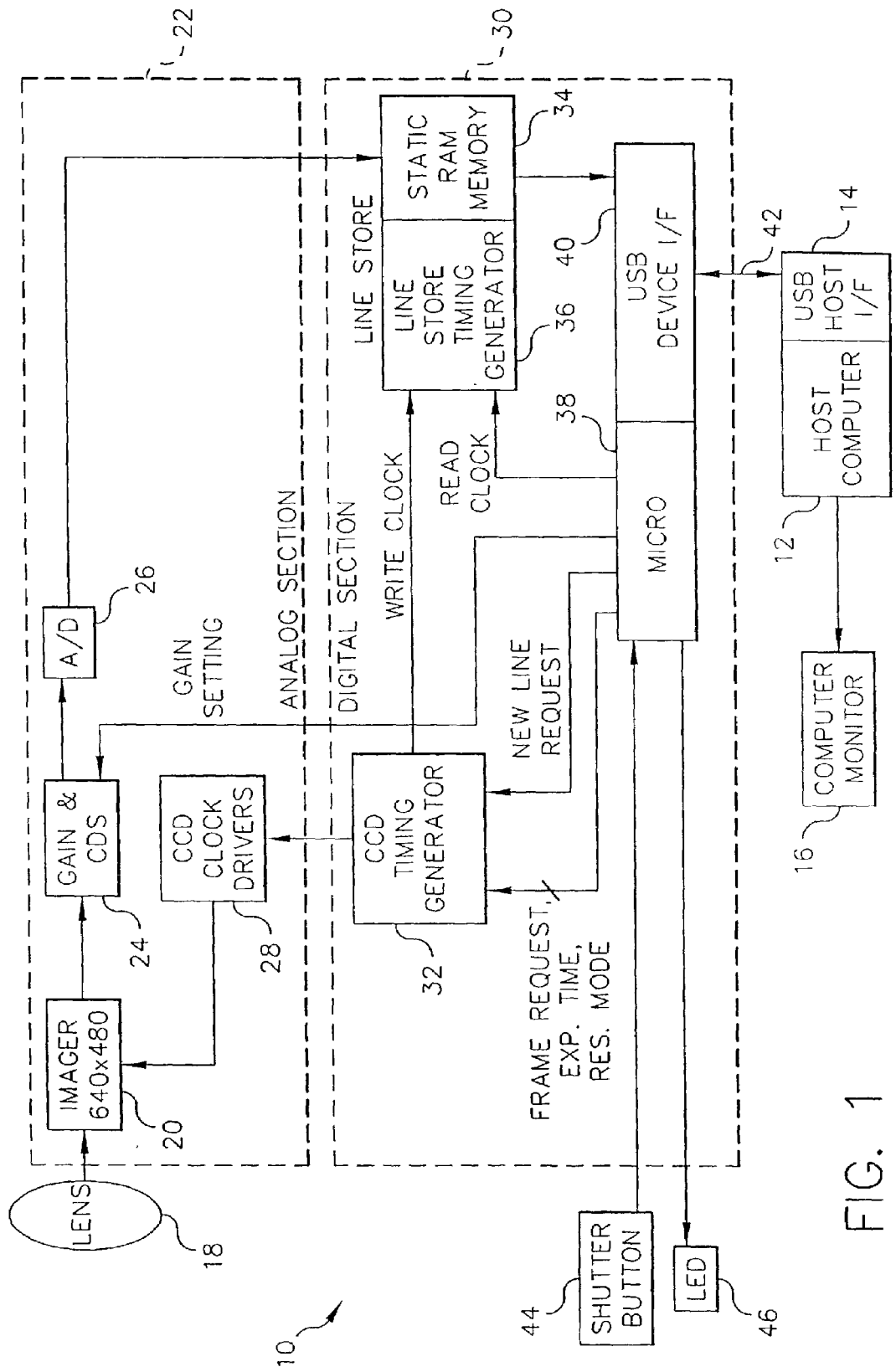
FIG. 1 is a block diagram of a digital imaging system including a digital camera tethered to a computer for use of dual mode software processing according to the invention.

A block diagram of a digital imaging system according to the invention is shown in FIG. 1. The system includes a camera 10 connected to a host computer 12 via a USB (universal serial bus) cable 42 connected to a USB digital host interface 14, which also provides power to the camera 10. USB is a well-known shared bus that can be connected to other devices, such as keyboards, printers, etc. (USB is described in the *Universal Serial Bus Specification*, 1.0 Final Draft Revision, Nov. 13, 1995, which can also be viewed on the Web at http://www.teleport.com/-USB.) The camera 10 can acquire both still and motion images. The camera data is processed by the host computer 12 to create final images that can be displayed on a computer monitor 16, e.g., transmitted along with audio as part of a "computer videoconference", etc. The camera 10 can produce both high quality (i.e., high resolution) still images and high frame rate, reduced resolution motion images.

The camera 10 includes an optical section 18 for imaging light from a subject upon an electronic image sensor 20. A preferred image sensor is a Kodak KAI-0320CM interline transfer, progressive-scan charge-coupled-device (CCD) image sensor with a usable active image area having 640 columns and 480 rows of color photoelements arranged in the well-known Bayer color filter array pattern shown in FIG. 4 (see U.S. Pat. No. 3,971,065 for further description of the Bayer pattern). The sensor 20 further includes masked pixels on one or more sides of the imager, which are used to provide a black level correction. An analog section 22 in the camera 10 includes the sensor 20, a CDS/gain block 24 for performing correlated double sampling (CDS) and setting the analog gain, an analog-to-digital (A/D) converter 26 for converting the analog output signal from the CCD sensor 20 to ,e.g., an 8-bit digital signal, and CCD clock drivers 28 for clocking the sensor 20. A digital section 30 includes a CCD timing generator 32, a static RAM memory 34, a line store timing generator 36, a microprocessor 38, and a USB device interface 40. The USB device interface 40 connects to the USB host interface 14 by means of a USB cable 42.

The sensor 20 is controlled by the timing generator 32 via the CCD clock driver 28. The digital data from the sensor 20 is temporarily stored in the static RAM memory 34, preferably a 64K bit static RAM memory (for example part number IDT7164 made by Integrated Device Technology, Inc.) which is controlled by a line store timing generator 36 so as to serve as a line store. Besides controlling the sensor 20, the CCD timing generator 32 also controls the line store write clock applied to the line store timing generator 36. The output of the line store memory 34 is connected to the host computer 12 via the USB device interface 40, which operates at a maximum data rate of 12 M bits/sec. (See the article "Universal Serial Bus to Simplify PC I/O", by Michael Slater in *Microprocessor Report*, Volume 9, Number 5, Apr. 17, 1995 for more detail about the benefits of the USB interface.). The USB interface 40, which may be incorporated as part of the microprocessor 38, such as the Intel 82930 microprocessor, reads data from the line store 34. The USB cable 42 includes four wires, one pair for sending data to and from the host computer 12, and a second pair for supplying power to the camera 10 from the host.

Figure 2:
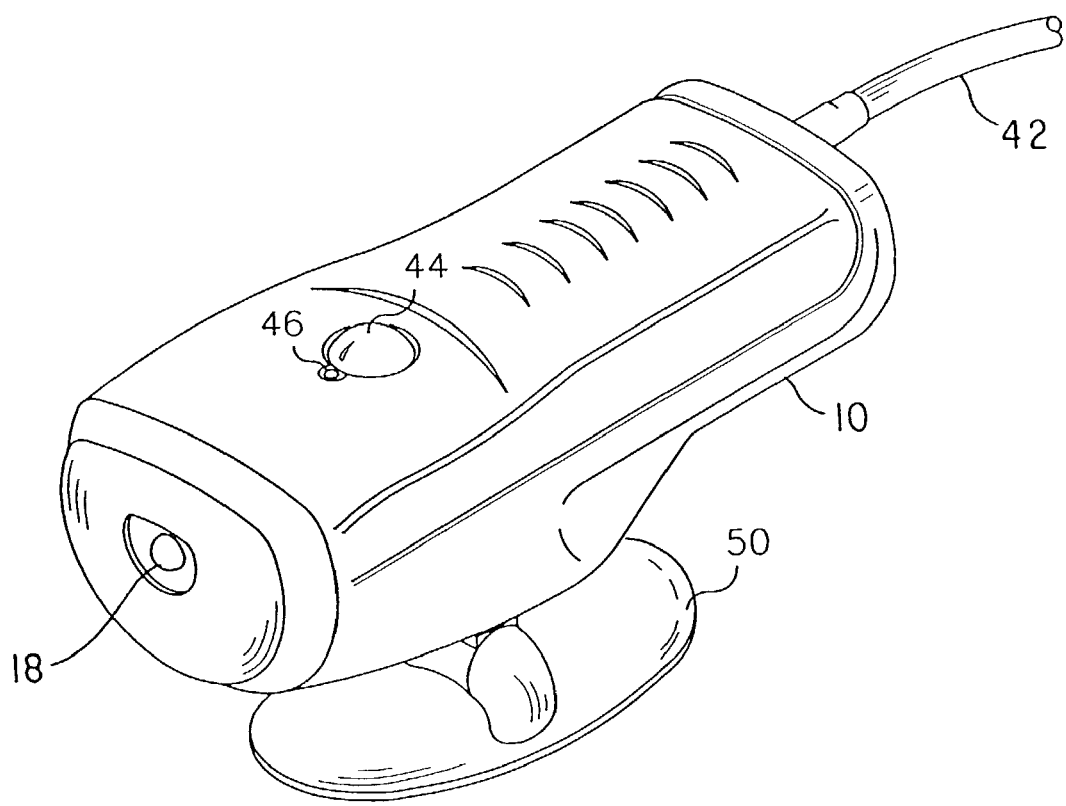
FIG. 2 is a drawing of the camera encasement for the camera shown in FIG. 1.

The camera 10, as shown in FIG. 1, also includes a shutter button 44 for initiating a still image capture sequence and a light emitting diode (LED) 46 for indicating operation of the camera. A drawing of the camera encasement is shown in FIG. 2. The camera 10 includes a detachable stand 50 which can be placed on top of the computer monitor 16 for "hands-free" operation. The camera 10 can also be removed from the stand 50 and used for "hand-held" operation. The encasement of the camera 10 shows the shutter button 44 and the LED indicator light 46, which is useful for the "hand-held" mode.

The host computer 12 controls the camera picture-taking process by instructing the camera 10 when to take still or motion pictures, and setting the electronic exposure time via the CCD timing generator 32 and the analog gain in the CDS/gain block 24 from the microprocessor 38. The USB hardware and software provides communication between the host 12 and the camera 10. When the camera 10 is connected to the host 12, camera driver software is loaded and run on the computer 12. An application program can then be run on the host 12 to invoke the motion mode and still mode processing to be described.

Figure 3B:
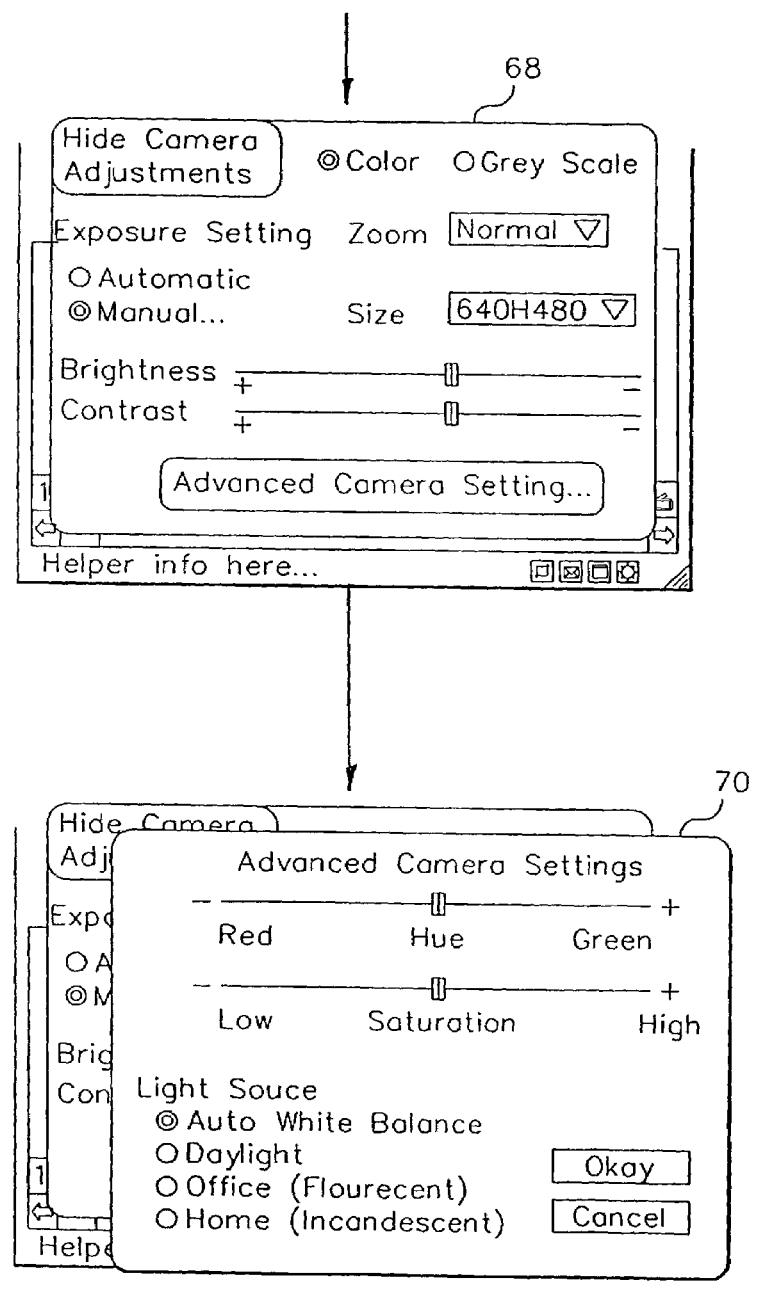
FIG. 3 shows illustrations of computer screens used as a camera user interface for the camera shown in FIG. 1.

Although the camera is capable of using default capture parameters, the user can chose preferred parameter values using the screens shown in FIG. 3. In this case, the user clicks on a "camera adjustments" icon 60 on a basic screen 62 in order to pull down a camera adjustments screen 64. By then clicking on an "advanced camera settings" icon 66, an advanced camera settings screen 68 is obtained, and so on through as many additional screens 70 as are needed. Different image processing "paths" are used for still and motion modes, but these paths are controlled by the same set of automatic or user adjusted parameters. The user can select the mode, using a toggle switch 72 shown in FIG. 3, and also adjust other parameters such as the white balance, color saturation, gamma, brightness, and contrast. Such adjustments are applied to both the motion and still modes in a manner that causes the same basic modifications to the images from both processing paths.

Figure 4:
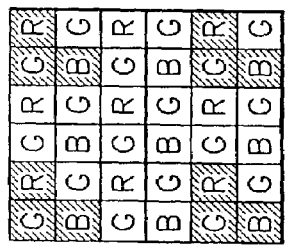
FIG. 4 is a diagram of the Bayer color filter pattern used in the camera shown in FIG. 1.

In the still mode, all of the pixels of the sensor, which has the Bayer color filter array pattern shown in FIG. 4, are read out. In the motion mode, it is possible to transfer to the host computer only a subset of the pixels, in order to reduce time required to transfer the data for each image, thereby allowing the frame rate to be increased. One preferred subsampled mode is indicated by the shaded pixels in FIG. 4. When the image is stored in the RAM memory line store 34, the read clock is enabled by the microprocessor 38 only for the shaded pixels. The other pixels are not read out of the line store. When the image is read from the line store 34 to the host, the image data is read out in line sequential color order.

As a result, all of the shaded green pixels of the top line are transferred first, then all of the shaded red pixels of the top line are transferred, and then all of the blue pixels of the second line are transferred.

Still Image Processing Path

Figure 5:
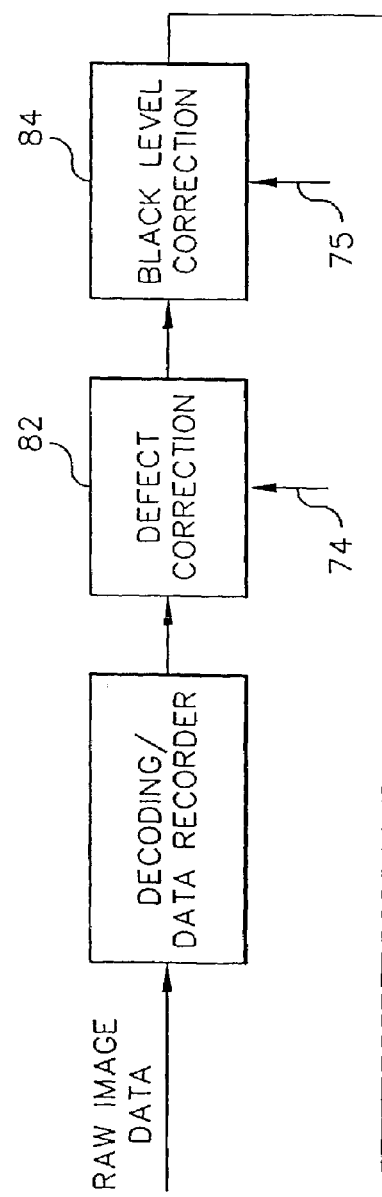
FIG. 5 is a block diagram of the still image processing path.
Figure 5:
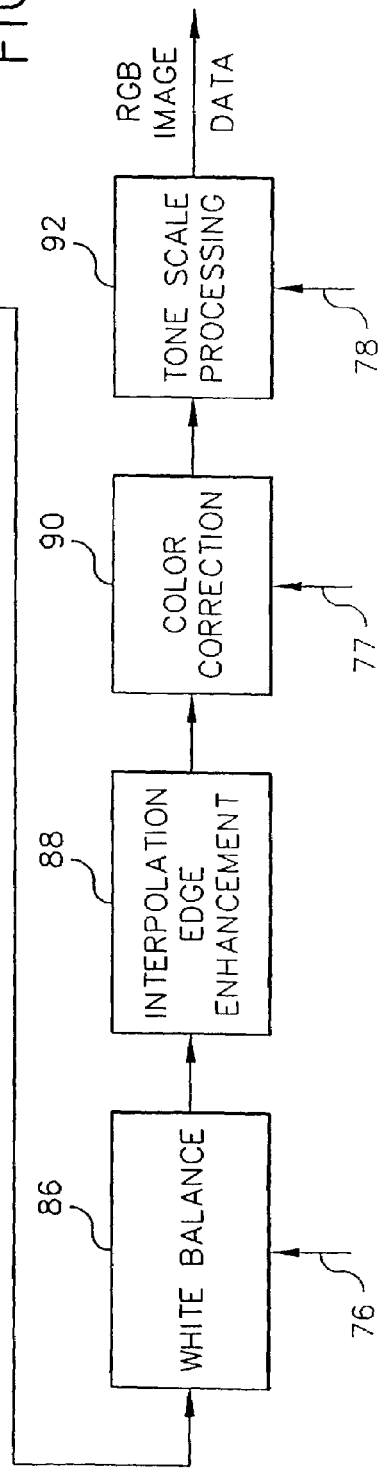
Figure 6:
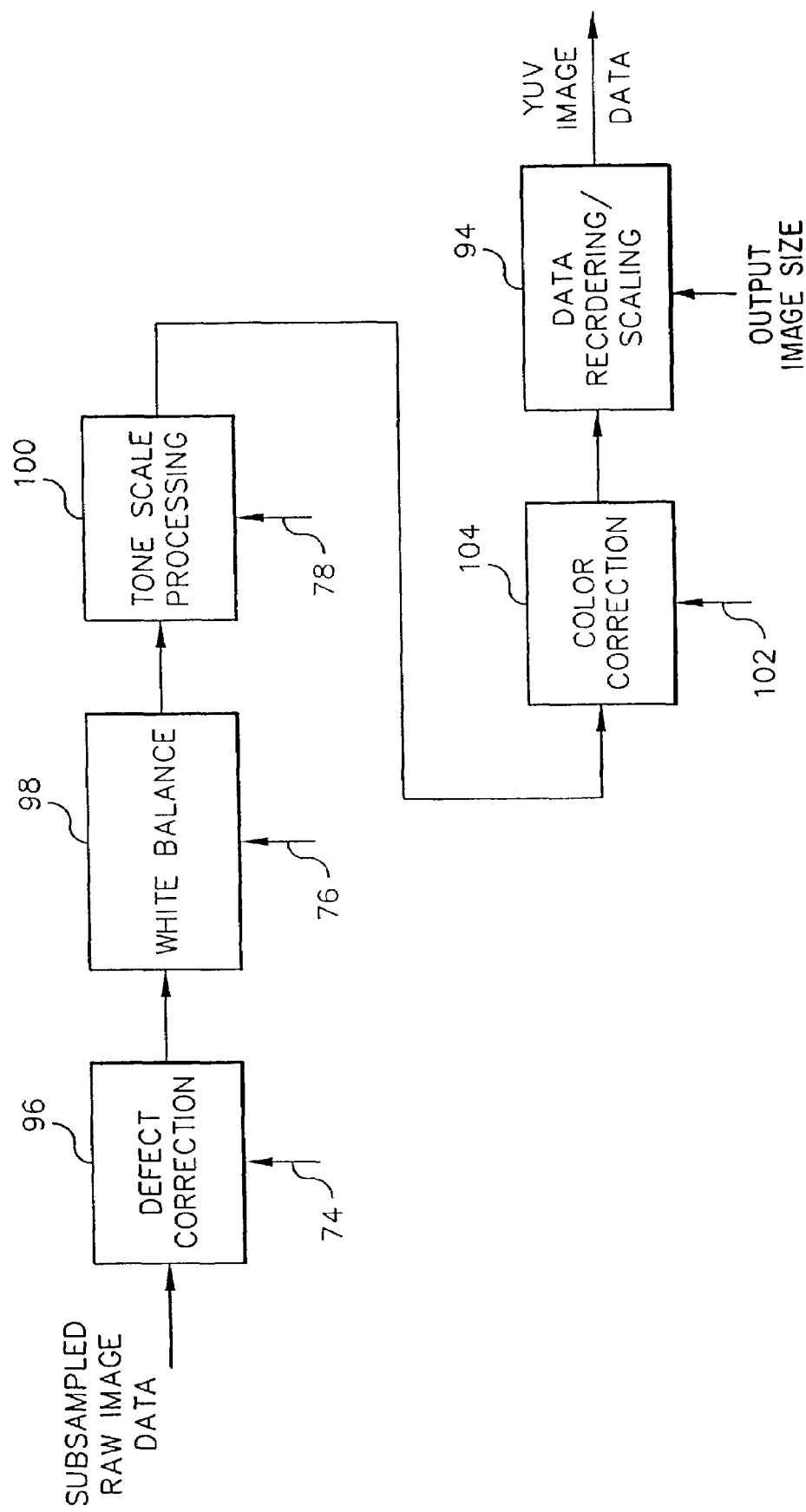
FIG. 6 is a block diagram of the motion image processing path.

The still image processing path used in the host computer 12, and as shown in FIG. 5, is more sophisticated than the motion image processing path shown in FIG. 6. The still image processing path is designed to produce the best quality images, with much less regard given to the time to process each image. Inputs to the process include a defect map 74, a black level array of pixel values 75, a set of three white balance values 76, a set of nine color matrix coefficients 77, and residual tone scale lookup tables 78. The input data is "raw" 8-bit-per-pixel data from the CCD sensor, and the output is 24-bit-per-pixel (8 bits-per-color) RGB color data. The intermediate calculations are done using 16-bit-per-color integer arithmetic, to prevent quantization artifacts. The input to the still mode processing is preferably the full resolution Bayer pattern data. The still mode processing steps are described below:

Defect Correction

The sensor defect map 74 is stored within the camera 10 using non-volatile memory (not shown in FIG. 1) and included with camera configuration information downloaded from the camera 10 to the host computer 12, where it is retrieved. Each bad pixel site in the raw image is corrected in a defect correction step 82 by interpolation from the four nearest neighbors of the same color, e.g., a spatial average of the four nearest neighbors from nearby rows and columns of the array.

Sensor Spatial Corrections

Since readout time for a full resolution image varies from the top to the bottom of the image, dark current may accumulate more in the bottom lines of the image. This will cause a spatially variant offset. The noise can be characterized by retrieving the masked pixels to the left of the active image pixels on the image sensor 20. These pixels are averaged together creating an offset correction for each line and stored in the black level array 75. The value for each line of the sensor array is subtracted from each pixel in the line in a black level correction step 84.

White Balance

Each color (RGB) is multiplied by its associated white balance correction factors 76 to correct for the scene illuminant in a white balance step 86. The factors can be calculated using an automatic white balance algorithm, or can be user adjustments. The sum of the three factors equals 1 so as not to change the luminance of the image.

Interpolation and Edge Enhancement

The missing color information is interpolated from the existing Bayer pattern pixels in an interpolation step 88 using any of a variety of conventional algorithms, but preferably an algorithm of the type described in U.S. Pat. No. 5,506,619, "Adaptive Color Plan Interpolation in Single Sensor Color Electronic Camera", issued on Apr. 9, 1996.

To provide a subjectively sharper image, a conventional inverse filter is used to provide edge enhancement, e.g., in combination with the interpolation step 88. For example, edge enhancement is performed on the interpolated RGB data using an FIR inverse filter. Inverse filter coefficient values that provide the desired inverse filter spatial frequency characteristic can be calculated using conventional filter design techniques, for example as described in *Digital Signal Processing* by Alan Oppenheim and Ronald Schafer, ©1975, Prentice Hall.

Output Color Space Conversion/Hue and Saturation Adjustment

The 3×3 matrix 77 applied to a color correction step 90 is a conventional color matrix of the type used to correct for color "cross-talk" in the sensor, as described in a journal article entitled "High-Performance Digital Color Video Camera", *Journal of Electronic Imaging,* Vol. 1, pp. 35-45, January 1992. Hue and saturation adjustments made by the user are applied by appropriately adjusting the matrix values of the still processing path.

Tone Scale Processing

Tone scale processing is a well known process conventionally implemented by lookup tables. User brightness, contrast, and gamma adjustments are made in the tonescale processing step 92 by appropriately adjusting the lookup table values 78 of the still processing path.

Motion Image Processing Path

The motion image processing path, shown in FIG. 6, employs processing steps that are simpler than the still image processing steps. For example, the motion processing path does not include edge enhancement and interpolation processing or black level correction, and most other processing steps are implemented using fewer operations. In addition, it creates an image in a different color space, YUV, which is more easily used as the input to motion video compression algorithms used in computer video conferencing applications. (In YUV space, the "U" and "V" represent B-Y (blue-luminance) and R-Y (red-luminance) color difference signals, respectively, as described in an article by D. H. Pritchard, "World Wide Color Television Standards—Similarities and Differences", SMPTE Journal, February 1980, pp. 111-120.) In addition, the YUV image records are subsampled so that the U and V color difference records contain only one-quarter as many values as Y.

Note, however, that the still image path uses the same parameter inputs as the motion path, that is, the same values for brightness, contrast, saturation, hue, white balance (r,g, b), and gamma. Consequently, the processing paths are expected to produce images having similar brightness, tone reproduction, and color saturation. In the motion mode, having a high frame rate is more important than having the highest possible resolution or color fidelity. The number of samples in the output image is normally much lower than that used for still images. The resolution is decreased in order to support a high motion frame rate. If the still image processing path was used, the frame rate would be very low. The motion mode further only operates on image "points", rather than on neighborhoods, so that, for example, each Y value in the output image is obtained by computations involving only one red input, one green input, and one blue input value—rather than multiple pixels values for each color. The motion mode processing steps are described below.

Defect Correction

The same sensor defect map 74 is used as in the still mode processing path. However, a simpler algorithm is used to replace the defective pixels in a defect correction step 96. Each bad pixel site in the raw image is corrected by replacing it with the last correct neighbor of the same color on the same line, rather than with a 4-pixel average.

White Balance

Each color pixel is multiplied in a white balance step 98 by its associated white balance correction factor, which is the same factor as used for the still mode processing path. This is done as part of the same lookup table that implements a subsequent tone scale processing step 100.

Tone Scale Processing

In the tone scale processing step 100, user brightness, contrast, and gamma adjustments are made by appropriately adjusting the lookup table values of the still processing path.

Output Color Space Conversion

A 3×3 matrix gamma-space color correction matrix 102 is applied to the signal stream in a color correction step 104 and approximately corrects for color "cross-talk" in the sensor, and provides pixel data in the desired "YUV" luminance/color difference output color space. The matrix 102 also modifies the image according to the current settings of the hue/saturation controls.

Decoding/Re-Ordering

Motion resolution images are created in a data reordering step 94 by using the adjacent RGB triplets indicated by the shaded pixels in the Bayer pattern shown in FIG. 4. Unlike the still mode processing, interpolation is not used to fill in the missing colors due to the extensive processing time requirement. The input data stream provided by the camera 10 to the computer 12 and to the data reordering step 94 is formatted as line sequential RGB data. The data is then resorted into pixel sequential RGB triplets to form the image.

Processing Path Parameter Control

Figure 7:
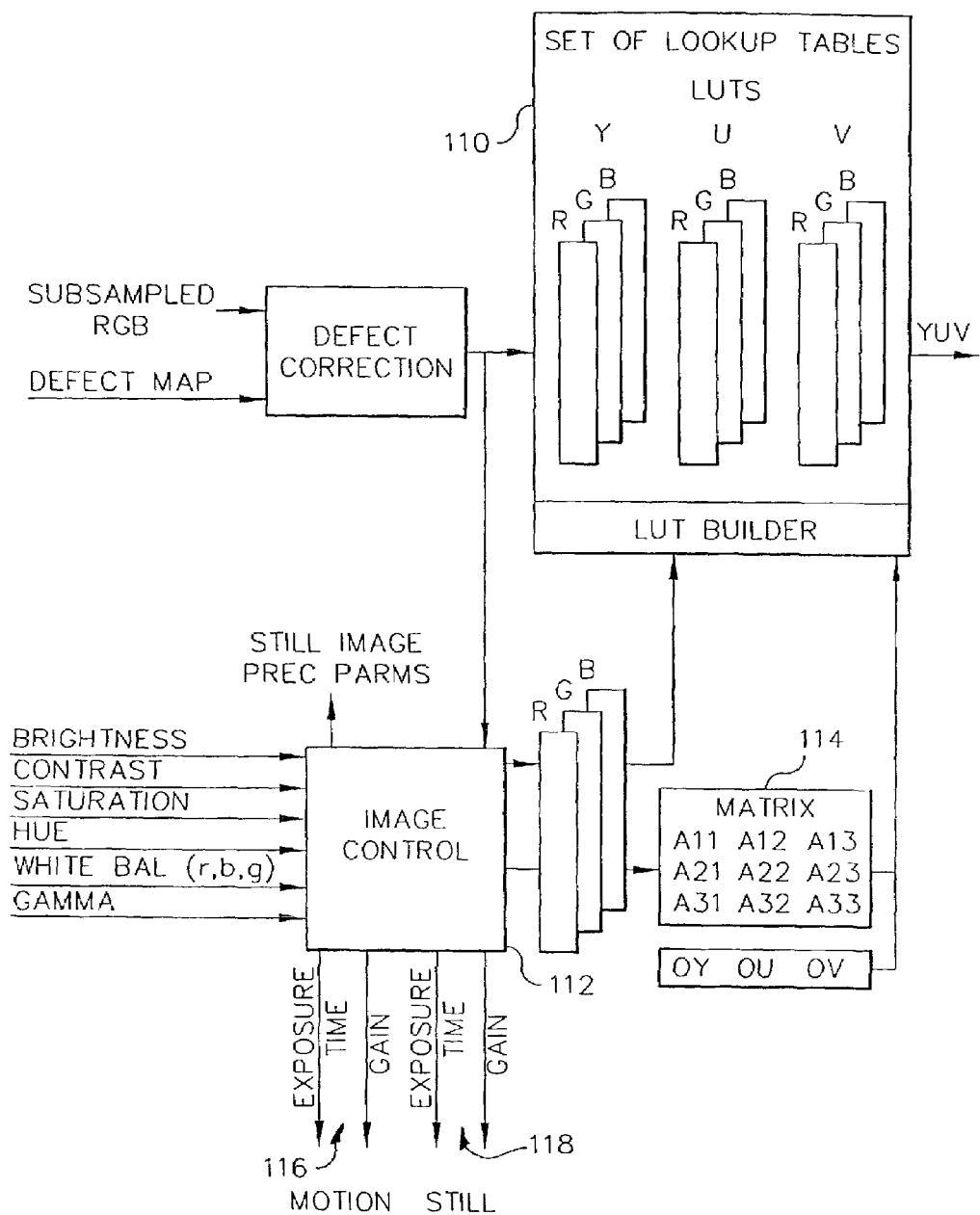
FIG. 7 is a block diagram of the parameter control section common to both modes and the lookup table section of the motion mode.

As mentioned earlier, both the still and motion processing paths are controlled by the same set of automatic and user-input control parameters. The latter parameters implement user preferences such as: brightness, contrast, hue and saturation. The automatic controls include auto-white balance and auto-exposure. As shown in FIG. 7, the motion mode processing is primarily implemented using LUTS (lookup tables) 110, as three channel LUTs are calculated based upon the white balance values, contrast, brightness and gamma settings. The image control block 112 provides the required information needed to build the lookup tables 110, and also generates exposure time and analog gain settings 116 used by the camera in the motion mode, as well as exposure time and analog gain settings 118 used by the camera in the still mode. In the preferred operating mode, the control block 112 is called by the video capture driver periodically to automatically adjust the camera exposure and intermittently to perform white balance. The control block 112 is also called into action in response to a user adjustment (contrast, brightness, hue or saturation).

The control software in the image control block 112 adjusts the color matrix 114 and lookup tables (LUTs) 110 in response to input white balance, hue, saturation, contrast, and brightness. The control block 112 also modifies the lookup tables 110 and the matrix 114 based upon the output of the auto exposure and auto white balance (AWB) control modules. The automatic exposure control modifies the contrast and brightness settings based on a luminance histogram of the previously captured images. The AWB module calculates the auto white balance settings that are added to the user specified white balance settings.

In the motion processing path, the white balance function, the color correction function and the tone scale processing are implemented by the set 110 of lookup tables, as shown in FIG. 7. The image control block 112 generates the lookup tables 110 to perform white balance, contrast, brightness, and gamma correction, and generates the matrix 114 to convert camera color space to YUV.

In the motion mode processing, each LUT 110 contains 256 entries. The Y output value is the sum of three LUT output values, one each for red, green and blue, which convert the image data from linear RGB data to gamma corrected Y data, thus implementing a tone scale operation followed by a 3×3 matrix type operation in a single process. The U and V values likewise are each the sum of three LUT output values, one each for red, green and blue, which convert the image data from linear RGB data to gamma corrected U and V data. The U and V data records preferably have one-half the number of pixels per line and one-half the number of lines per frame as the Y data. When an auto white balance function is enabled, then any user white balance adjustments are applied as corrections to the autowhite balance factors.

In summary, a tethered digital camera includes both a motion mode and a still mode. Image processing is performed in software on the host computer. The motion mode processing is performed using algorithms and software approaches designed to minimize processing time and produce a relatively low resolution YUV image appropriate for applications such as videoconferencing. The motion mode uses only "point" processing operations. The still mode processing uses more elaborate "neighborhood" algorithms to optimize the image quality of a relatively high resolution RGB output image. It uses spatial processing as well as point processing, and replaces defective pixels with a spatial average of neighboring pixels. The same user controls for contrast, color saturation, brightness, hue and white balance affect both processing modes via the different processing paths.

The invention has been described with reference to a preferred embodiment. However, it will be appreciated that variations and modifications can be effected by a person of ordinary skill in the art without departing from the scope of the invention.

PARTS LIST

- 10 digital camera
- 12 host computer
- 14 USB digital host interface
- 16 computer monitor
- 18 optical section
- 20 electronic image sensor
- 22 analog section
- 24 CDS/gain block
- 26 A/D converter
- 28 CCD clock drivers
- 30 digital section
- 32 CCD timing generator
- 34 static RAM memory (line store)
- 36 line store timing generator
- 38 microprocessor
- 40 USB device interface
- 42 USB cable
- 44 shutter button
- 46 LED
- 50 detachable stand
- 60 camera adjustment icon
- 62 basic screen
- 64 camera adjustments screen
- 66 advanced camera settings icon
- 68 advanced camera settings screens 70 additional screen
72 toggle switch
74 defect map
75 black level array
76 white balance values
77 color matrix
78 residual tone scale lookup tables
82 defect correction step
84 black level correction step
86 white balance step
88 interpolation step
90 color correction step
92 tone scale processing step
94 data reordering step
96 defect correction step
98 white balance step
100 tone scale processing step
102 color matrix
110 set of lookup tables
112 image control
114 matrix
116 motion settings
118 still setting

What is claimed is:

1. A digital camera system comprising a digital camera connectable by a single cable interface to a host computer and software for processing images from said digital camera on said host computer;
the computer being configurable under control of the software into a still processing mode that produces a digital still output image from a single still mode image, having columns and rows of pixels, provided by the digital camera;
the computer being further configurable under control of the software into a motion processing mode that produces a series of digital motion output images derived from a series of motion mode images provided by the digital camera, one or more of the motion mode images each having fewer rows and fewer columns of pixels than the still mode image, wherein the still processing mode includes edge enhancement processing, and the motion processing mode does not include edge enhancement processing;
the computer being further configurable under control of the software to provide a user interface to allow a user to select at least one of the still processing mode and the motion processing mode;
wherein both the still mode image and the series of motion mode images are transferable from the digital camera to the computer using the single cable interface; and
wherein the computer communicates the selected mode to the digital camera using the single cable interface.

2. The digital camera system as claimed in claim 1 wherein the digital still output image is provided in an RGB color space, and the digital motion output images are provided in a YUV color space.

3. The digital camera system as claimed in claim 1 wherein the single cable interface is a universal serial bus interface.

4. The digital camera system as claimed in claim 1 wherein the digital camera includes a sensor having a color filter array, wherein the still processing mode provides color signals using adaptive interpolation to interpolate missing color information from the color filter array and wherein the motion processing mode provides color signals without using adaptive interpolation.

5. The digital camera system as claimed in claim 1 wherein the still processing mode uses a first color correction process, and the motion processing mode uses a second color correction process different from said first color correction process, and wherein the computer is further configurable under control of the software to provide at least one user adjustable color setting which adjusts the color correction provided by both the first color correction process and the second color correction process.

6. The digital camera system as claimed in claim 5 wherein the at least one user adjustable color setting modifies color saturation.

7. The digital camera system as claimed in claim 1 wherein the still processing mode includes black level correction processing, and the motion processing mode does not include black level correction processing.

8. A digital camera system comprising a digital camera connectable to a host computer and software for processing images from said digital camera on said host computer;
the computer being configurable under control of the software into a still processing mode that produces a digital still output image from a single image provided by the digital camera;
the computer being further configurable under control of the software into a motion processing mode that produces a series of digital motion output images derived from a series of images provided by the digital camera, wherein the still processing mode includes edge enhancement processing, and the motion processing mode does not include edge enhancement processing;
wherein the digital camera includes a sensor having a color filter array, wherein the still processing mode provides color signals using adaptive interpolation to interpolate missing color information from the color filter array, and wherein the motion processing mode provides color signals without using adaptive interpolation.

9. The digital camera system as claimed in claim 8 wherein the still processing mode uses a first color correction process, and the motion processing mode uses a second color correction process different from said first color correction process, and wherein the computer is further configurable under control of the software to provide at least one user adjustable color setting which adjusts the color correction provided by both the first color correction process and the second color correction process.

10. The digital camera system as claimed in claim 9 wherein the at least one user adjustable color setting modifies color saturation.

11. The digital camera system as claimed in claim 8 wherein the still processing mode includes black level correction processing, and the motion processing mode does not include black level correction processing.

12. A digital camera system comprising a digital camera connectable to a host computer;
the digital camera system providing a still processing mode that produces a digital still output image from a single image provided by the digital camera;
the digital camera system further providing a motion processing mode that produces a series of digital motion output images derived from a series of images provided by the digital camera, wherein the still processing mode includes edge enhancement processing, and the motion processing mode does not include edge enhancement processing;
wherein the digital camera includes a sensor having a color filter array, wherein the still processing mode provides color signals using adaptive interpolation to interpolate missing color information from the color filter array, and wherein the motion processing mode provides color signals without using adaptive interpolation.

13. The digital camera system as claimed in claim 12 wherein the still processing mode uses a first color correction process, and the motion processing mode uses a second color correction process different from said first color correction process, and wherein the system further provides at least one user adjustable color setting which adjusts the color correction provided by both the first color correction process and the second color correction process.

14. The digital camera system as claimed in claim 13 wherein the at least one user adjustable color setting modifies color saturation.

15. The digital camera system as claimed in claim 12 wherein the still processing mode includes black level correction processing, and the motion processing mode does not include black level correction processing.

16. A method for use in a digital camera system comprising a digital camera connectable by a single cable interface to a host computer, the method comprising the steps of:
  in a still processing mode, producing a digital still output image from a single still mode image, having columns and rows of pixels, provided by the digital camera;
  in a motion processing mode, producing a series of digital motion output images derived from a series of motion mode images provided by the digital camera, one or more of the motion mode images each having fewer rows and fewer columns of pixels than the still mode image, wherein the still processing mode includes edge enhancement processing, and the motion processing mode does not include edge enhancement processing; and
  providing a user interface to allow a user to select at least one of the still processing mode and the motion processing mode;
  wherein both the still mode image and the series of motion mode images are transferable from the digital camera to the computer using the single cable interface; and
  wherein the computer communicates the selected mode to the digital camera using the single cable interface.

17. A method for use in a digital camera system comprising a digital camera connectable by a single cable interface to a host computer, the method comprising the steps of:
  in a still processing mode, producing a digital still output image from a single still mode image, having columns and rows of pixels, provided by the digital camera;
  in a motion processing mode, producing a series of digital motion output images derived from a series of motion mode images provided by the digital camera, one or more of the motion mode images each having fewer rows and fewer columns of pixels than the still mode image, wherein the still processing mode includes black level correction processing, and the motion processing mode does not include black level correction processing; and
  providing a user interface to allow a user to select at least one of the still processing mode and the motion processing mode;
  wherein both the still mode image and the series of motion mode images are transferable from the digital camera to the computer using the single cable interface; and
  wherein the computer communicates the selected mode to the digital camera using the single cable interface.

18. A method for use in a digital camera system comprising a digital camera connectable to a host computer, the method comprising the steps of:
  in a still processing mode, producing a digital still output image from a single image provided by the digital camera; and
  in a motion processing mode, producing a series of digital motion output images derived from a series of images provided by the digital camera, wherein the still processing mode includes edge enhancement processing, and the motion processing mode does not include edge enhancement processing;
  wherein the digital camera includes a sensor having a color filter array, wherein the still processing mode provides color signals using adaptive interpolation to interpolate missing color information from the color filter array, and wherein the motion processing mode provides color signals without using adaptive interpolation.

19. A method for use in a digital camera system comprising a digital camera connectable to a host computer, the method comprising the steps of:
  in a still processing mode, producing a digital still output image from a single image provided by the digital camera; and
  in a motion processing mode, producing a series of digital motion output images derived from a series of images provided by the digital camera, wherein the still processing mode includes black level correction processing, and the motion processing mode does not include black level correction processing;
  wherein the digital camera includes a sensor having a color filter array, wherein the still processing mode provides color signals using adaptive interpolation to interpolate missing color information from the color filter array, and wherein the motion processing mode provides color signals without using adaptive interpolation.

\* \* \* \* \*